United States Patent [19]
Canova

[11] Patent Number: 5,485,060
[45] Date of Patent: Jan. 16, 1996

[54] ELECTRONIC REACTOR FOR THE SUPPLY OF DISCHARGE LAMPS WITH AN OSCILLATOR CIRCUIT TO LIMIT THE CREST FACTOR AND TO CORRECT THE POWER FACTOR

[75] Inventor: Antonio Canova, Arezzo, Italy

[73] Assignee: Magnetek S.p.A., Siena, Italy

[21] Appl. No.: 386,810

[22] Filed: Feb. 8, 1995

[30] Foreign Application Priority Data

Feb. 11, 1994 [EP] European Pat. Off. ............... 94830048

[51] Int. Cl.⁶ .................................................. H05B 37/02
[52] U.S. Cl. ..................... 315/209 R; 315/247; 315/244; 315/232
[58] Field of Search .......................... 315/209 R, 247, 315/244, 242, 232, 283, 356

[56] References Cited

U.S. PATENT DOCUMENTS

| | | |
|---|---|---|
| 4,939,429 | 8/1990 | Rodriguez-Cavazos et al. ...... 315/411 |
| 4,985,664 | 1/1991 | Nilssen . | |
| 5,001,400 | 3/1991 | Nilssen ................................. 315/209 R |
| 5,172,309 | 12/1992 | De Doncker et al. ................... 363/132 |

FOREIGN PATENT DOCUMENTS

| | | |
|---|---|---|
| 0372303 | 11/1989 | European Pat. Off. . |
| 0488478 | 11/1991 | European Pat. Off. . |
| 0541909 | 7/1992 | European Pat. Off. . |
| 0534727 | 9/1992 | European Pat. Off. . |
| 2527889 | 12/1983 | France . |

Primary Examiner—Benny Lee
Assistant Examiner—Reginald A. Ratliff
Attorney, Agent, or Firm—McGlew and Tuttle

[57] ABSTRACT

The electronic reactor for discharge lamps (L) comprises a bridge rectifier (5) connected to an alternating voltage source (3); a half-bridge with two controlled switching means (11, 13) made alternately conducting to connect the said lamp (L) and the said bridge rectifier (5); a resonant load circuit (17) connected to the said half-bridge (11, 13); and a smoothing capacitor (29) connected in parallel with the half-bridge (11, 13). An auxiliary resonant circuit (33) is provided to reduce the crest factor and correct the power factor between the output (19) of the half-bridge (11, 13) and the positive pole (5A) of the bridge rectifier (5).

10 Claims, 5 Drawing Sheets

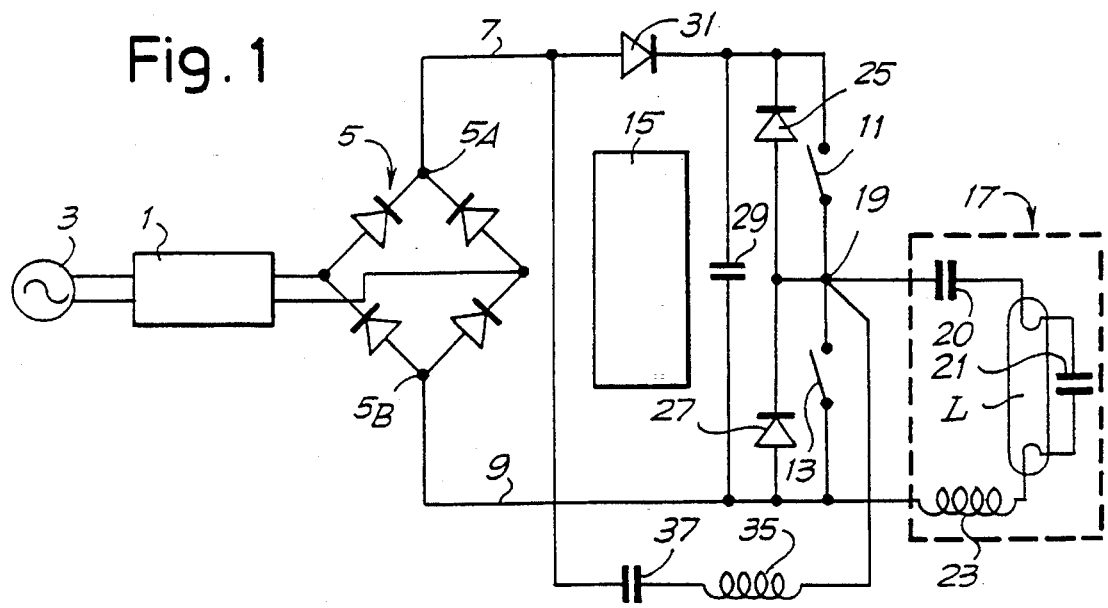
Fig. 1
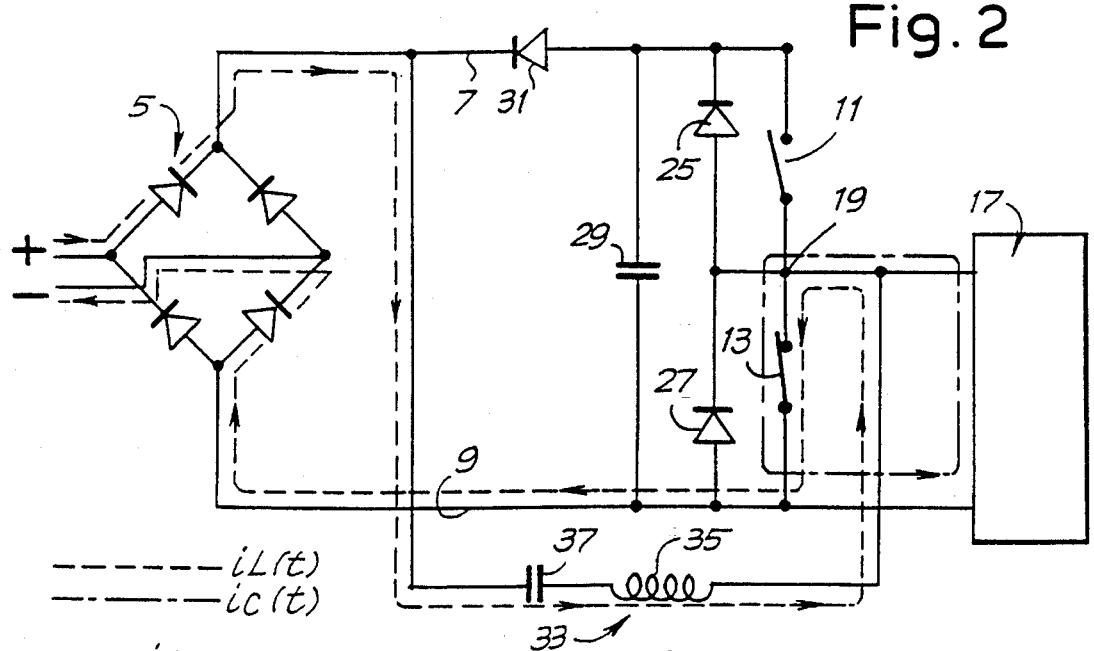
Fig. 2
Fig. 2A  Fig. 2B

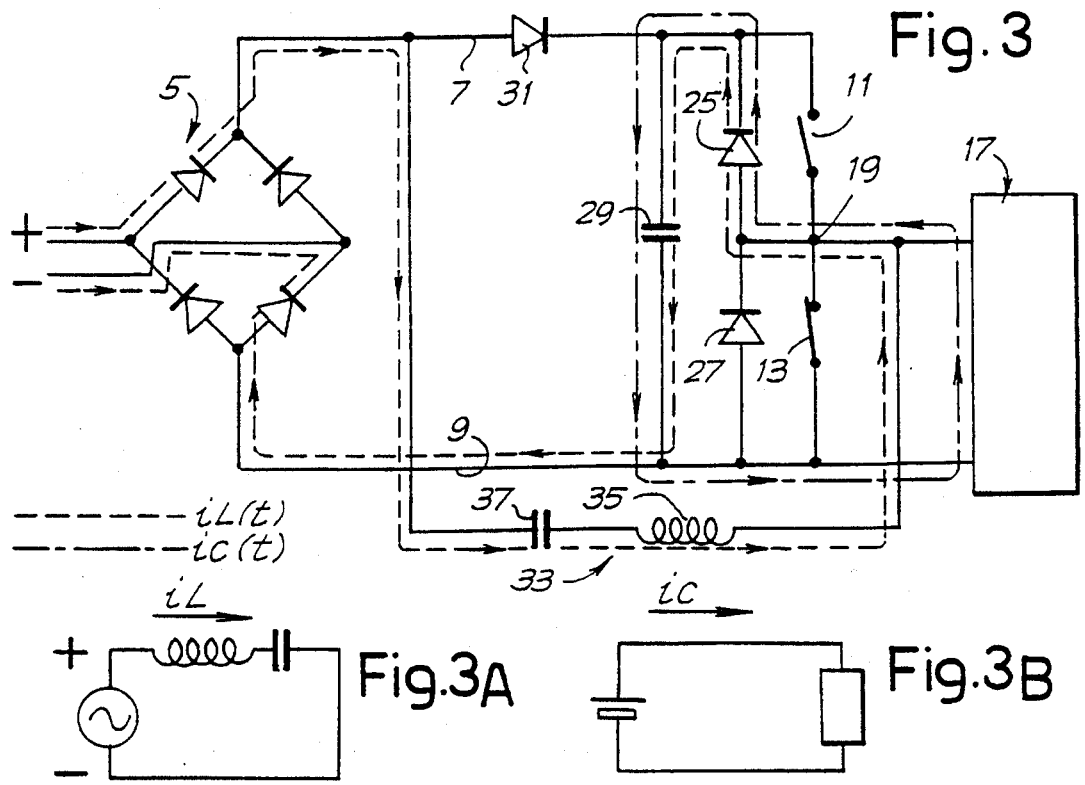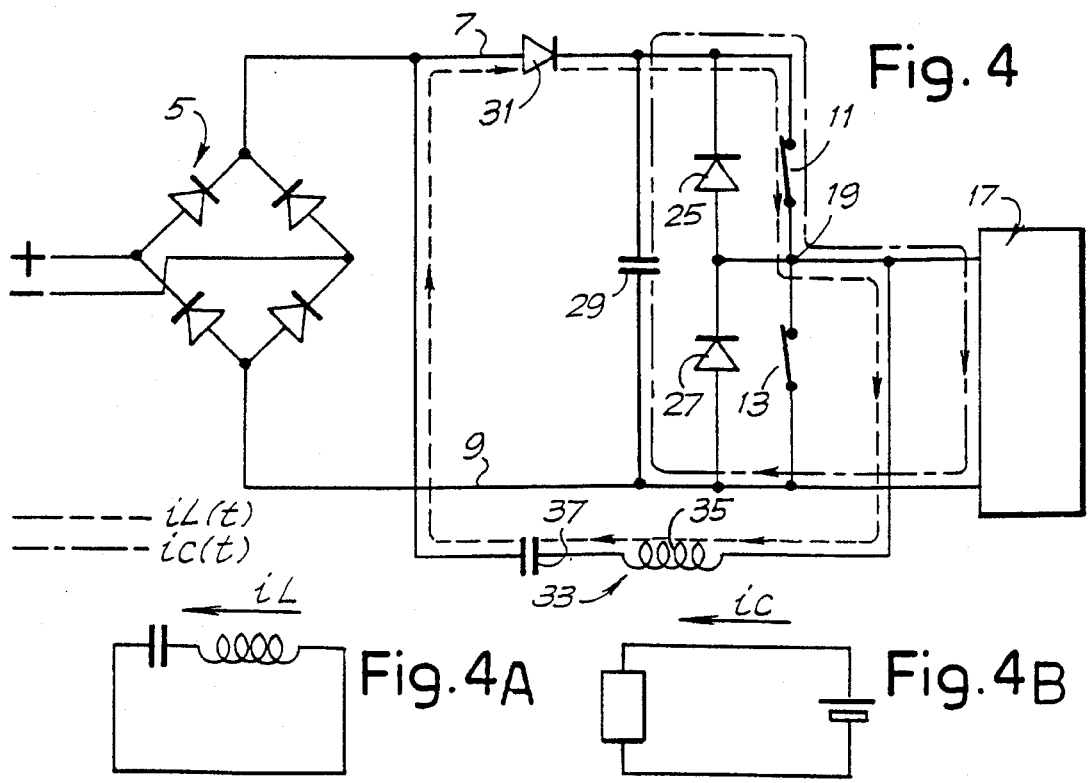

--- iL(t)
-·- iC(t)

5,485,060

ELECTRONIC REACTOR FOR THE SUPPLY OF DISCHARGE LAMPS WITH AN OSCILLATOR CIRCUIT TO LIMIT THE CREST FACTOR AND TO CORRECT THE POWER FACTOR

DESCRIPTION

The invention relates to an electronic reactor or ballast for one or more discharge lamps of the type indicated in the introductory part of claim 1.

A circuit of this type is described in IT-B-1208439. The electronic reactor generally has an input section consisting of a low-pass filter and a diode bridge, which has the function of rectifying the alternating mains voltage to supply it to a power oscillator in which the direct voltage is transformed into high-frequency alternating voltage and is then transferred to the resonant circuit comprising the lamp. The supply voltage across the terminals of the load circuit is a square-wave voltage at a high frequency, typically of the order of 25–30 kHz. It is supplied to a load circuit which typically has at least one discharge lamp with a capacitor in parallel and a stabilizing inductance in series. In the circuit described in IT-B-1208439, a capacitor is also provided, in series with the load circuit, enabling the power factor to be corrected.

In conventional circuits, the amplitude of the current and voltage across the lamp terminals fluctuate at low frequency, typically at twice the mains frequency. This phenomenon is known as "ripple". The extent of this fluctuation is characterized by what is known as a crest factor. The fluctuation of the maximum value of the current amplitude in the lamp is extremely harmful, since it curtails the mean service life of the lamp.

In conventional circuits, this fluctuation is partly limited by using a smoothing capacitor of suitable capacitance connected in parallel with the lamp supply half-bridge. However, for reasons of cost and overall size, this system cannot be used to obtain a reduction in the crest factor beyond a certain limit.

The object of the present invention is to propose an improvement to the common electrical reactor which enables the ripple phenomenon to be reduced drastically, if not completely eliminated.

Essentially, the invention provides an auxiliary series resonant circuit connected between the output of the lamp supply half-bridge and the bridge rectifier. This auxiliary resonant circuit stores and returns power with each switching cycle of the switch means of the load circuit supply half-bridge. The oscillation of the maximum current intensity in the load circuit is therefore reduced, and consequently the crest factor is reduced.

In practice, the auxiliary series resonant circuit is a circuit of the LC type, with one inductance and one capacitor, and is connected between the output of the half-bridge and the positive pole of the rectifier. To limit the overall size of the circuit, in a particularly advantageous embodiment the inductance of the auxiliary resonant circuit and the inductance of the load circuit may be wound on a common ferromagnetic core advantageously consisting (in a preferred embodiment) of a three-column core with two air gaps on the two outer columns on which the two windings are made.

The auxiliary resonant circuit also simultaneously corrects the power factor. By using the auxiliary resonant circuit it is possible to obtain, for the same value of the smoothing capacitor, a much smaller crest factor than in conventional reactors.

An electronic reactor with an inductance connected between the output of the lamp supply half-bridge and the bridge rectifier is known from U.S. Pat. No. 5,001,400. However, this inductance does not form part of an oscillating circuit.

Further characteristics of the electronic reactor according to the invention are indicated in the attached claims.

The invention will be more clearly understood from the description and the attached drawing which shows a non-restrictive practical example of the invention. In the drawing,

BRIEF DESCRIPTION OF THE DRAWINGS

FIG. 1 is a circuit diagram of the reactor;

FIGS. 2 to 5 show successive phases of operation of the circuit shown in FIG. 1;

DESCRIPTION OF THE PREFERRED EMBODIMENTS

Figure 5:
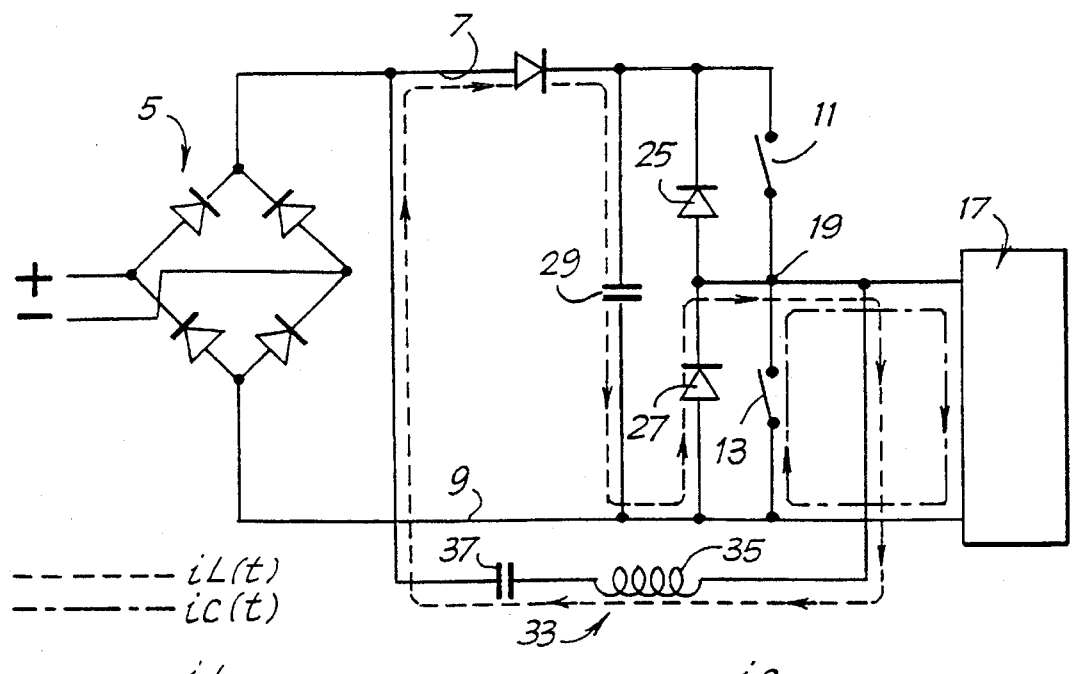

With reference to FIG. 1 initially, the circuit has a filter 1, at whose input there is an alternating voltage supplied from a source indicated schematically by 3. The filter output is connected to a diode bridge rectifier indicated by 5. Two lines 7 and 9, positive and negative respectively, are connected to the positive pole 5A and the negative pole 5B of the bridge rectifier 5. The direct voltage supplied by the bridge rectifier 5 is transformed to alternating voltage at high frequency by two switches 11 and 13, suitably controlled by an electronic control circuit 15, of a type known in itself and not described in greater detail. The load supply voltage is obtained by alternate switching of the two switches 11 and 13. In the example illustrated, the load circuit, indicated as a whole by 17, is connected between the output 19 of the half-bridge formed by the switches 11 and 13 and the negative line 9, but could also be connected between the said output 19 and the positive line 7. The load circuit comprises a discharge lamp L in parallel with a capacitor 21. An inductance 23, consisting of a stabilizing coil, and a capacitor 20 are connected in series with the lamp L and the capacitor 21. The load circuit could also comprise two or more lamps with corresponding capacitors and inductances, in series and in parallel respectively.

Two diodes 25 and 27 are connected in parallel with the two switches 11 and 13 respectively of the supply half-bridge of the load circuit. A smoothing capacitor 29 is also connected in parallel with the half-bridge between the negative line 9 and the positive line 7 down-line from a diode 31.

An auxiliary series resonant circuit indicated in a general way by 33 and comprising an inductance 35 and a capacitor 37 is connected between the output 19 of the half-bridge formed by the switches 11 and 13 and the positive pole 5A of the bridge rectifier 5.

The four phases of each switching cycle of the circuit described above will now be described with reference to FIGS. 2 to 5 and 6A to 6D. The load current variation shown in FIGS. 6A–6D is intended to relate to a cycle which is repeated with a frequency of 25–30 kHz, while the input voltage of the bridge 5 varies sinusoidally at the mains frequency (50 Hz).

Figure 6A:
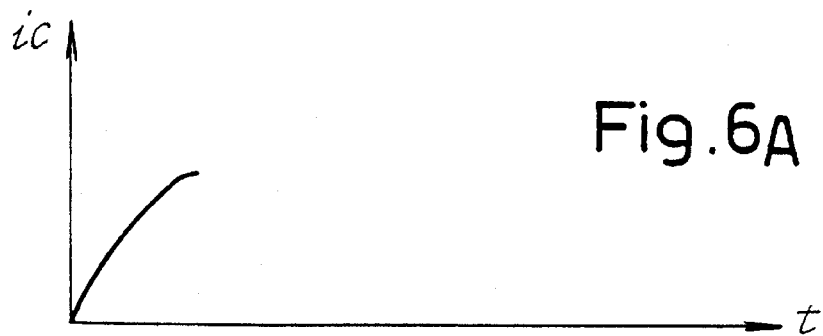
FIGS. 6A–6D show the variation of the current in the circuit in the four phases illustrated in FIGS. 2 to 5.
Figure 6B:
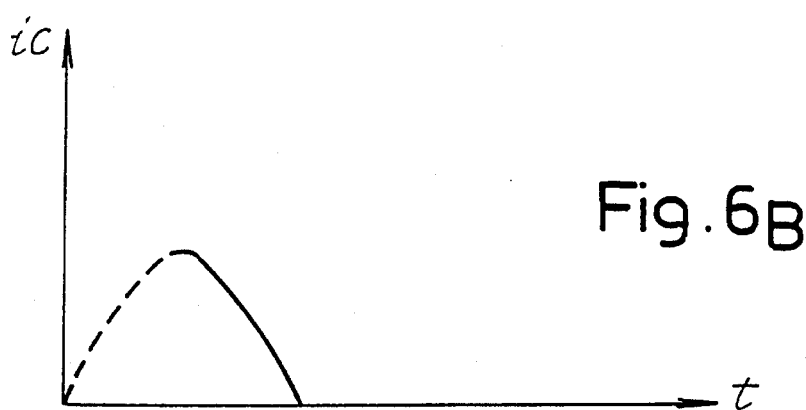

In the first phase (illustrated in FIGS. 2, 2A and 2B), the switch 13 is closed, while the switch 11 is open. The current $i_c$ in the auxiliary resonant circuit flows in the direction shown in FIG. 2 from the positive pole 5A of the bridge rectifier through the resonant circuit 33, the switch 13 and the line 9 to the negative pole 5B of the bridge rectifier 5. Since the circuit 33 is a resonant circuit, the current $i_c(t)$ on the load varies as shown in FIG. 6A. FIGS. 2A and 2B show the equivalent circuits of the load current $i_c$ and the current $i_L$ in the resonant circuit. As shown in FIG. 2B, the load is across the line.

Before the current $i_c(t)$ is inverted, the switch 13 is opened and the circuit is in the state shown in FIG. 3, with both switches 11 and 13 open. The current $i_L$ is passed through the diode 25 across the capacitor 29, to which the load current $i_c$ is also passed. In this phase the smoothing capacitor 29 is charged and the current $i_c$ reaches zero as shown in the graph in FIG. 6B. In the equivalent circuits shown in FIGS. 3A and 3B, the smoothing capacitor is represented by a source of direct voltage.

Figure 6C:
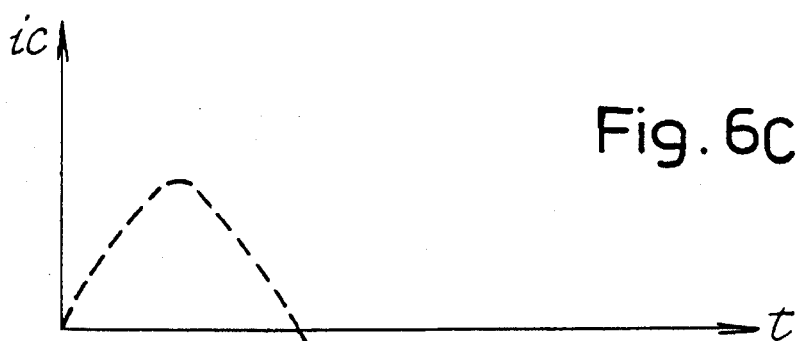

Before the current $i_c$ reaches zero, the switch 11 is closed, while the switch 13 remains open. The circuit enters the state shown in FIG. 4. In this phase, the residual power stored in the auxiliary resonant circuit 33 is exchanged between the reactive components 35 and 37 of the resonant circuit 33, producing the current $i_L$ which flows as shown in FIG. 4. The power previously stored in the smoothing capacitor 29 is also returned to the load in this phase, producing a current $i_c$ indicated in FIG. 4, as shown in the equivalent circuit in FIG. 4B, in which the capacitor 29 is again represented by a direct voltage source. The variation of the current $i_c$ is shown in FIG. 6C.

Figure 6D:
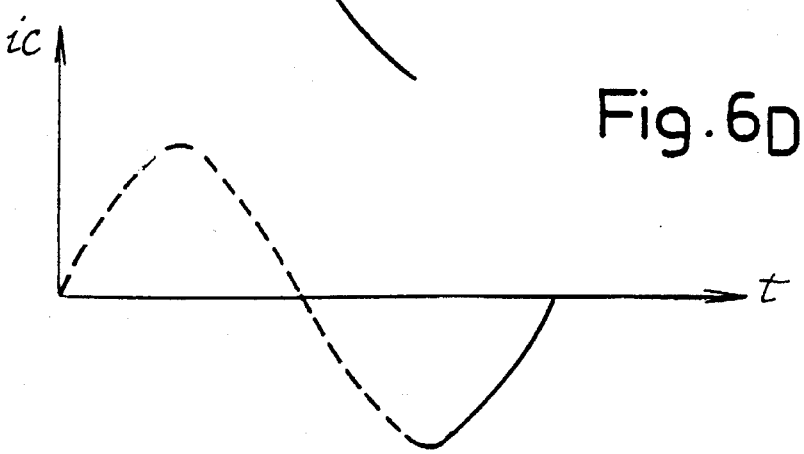

The switch 11 is then opened again and the circuit enters the state shown in FIG. 5, in which the current $i_L$ flows through the diode 27 and charges the capacitor 29. The current $i_c$ varies as shown in FIG. 6D. At the end of this phase, the current again reaches zero, and when this value is reached the switch 13 is closed again to return the circuit to the initial state shown in FIG. 2.

Figure 5A:
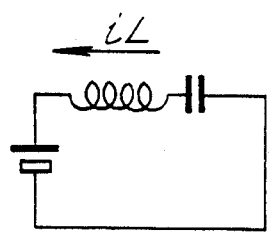
Figure 5B:
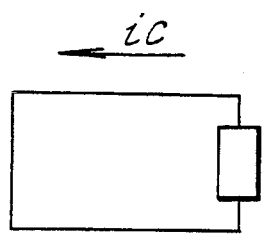

As may be seen from an examination of the equivalent circuits in FIGS. 5A and 5B, the power stored in the auxiliary resonant circuit 33 can be used (in the phase shown in FIG. 5 with the switches 11 and 13 open) to reduce the crest factor and to bring the fluctuation of the load current to a minimum value.

In this state, while the load 17 is connected across the line, and the current $i_c$ is flowing in it (FIG. 5B), the current $i_L$ is flowing in the auxiliary resonant circuit 33 and charging the capacitor 29, represented by the voltage source in FIG. 5A. Thus the power is returned to the capacitor 29.

Figure 8:
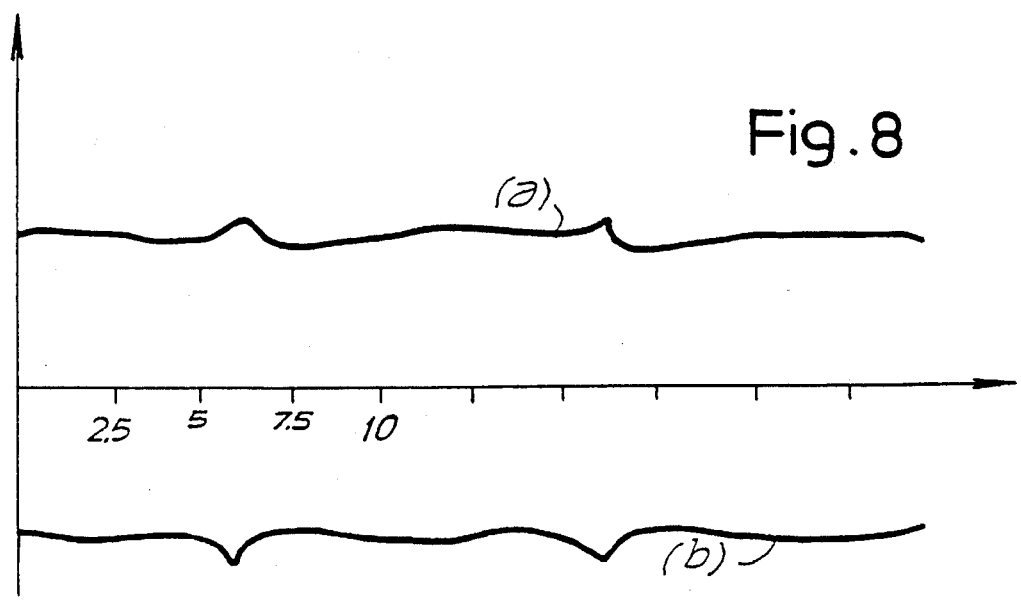
FIG. 8 is a graph of the lamp current as a function of time.
Figure 9:
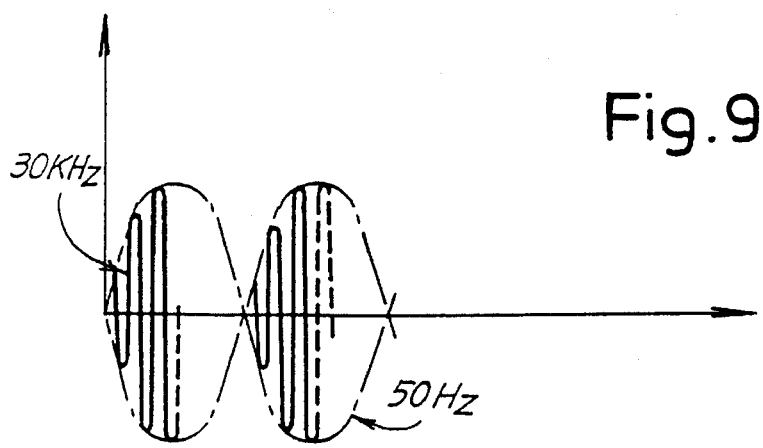
FIG. 9 is a graph of the current in the auxiliary oscillator circuit.

The use of the auxiliary resonant circuit results in a reduction of the crest factor in the current $i_c$, as seen in FIG. 8, where the graph of the current $i_c$ as a function of time is shown. The letters (a) and (b) indicate the envelopes of the maxima and minima of the waveforms representing the high-frequency current across the load 17. The undulation of the curves a and b is greatly reduced by-comparison with the conventional circuits in which the auxiliary series resonant circuit 33 is not provided. Conversely, FIG. 9 shows the variation of the current $i_L$ where (c) and (d) are the envelopes of the maxima and minima. The graph showing the variation of the current is drawn in an approximate form, since it should show a frequency of 30 kHz, whereas the envelope has a frequency of 50 Hz.

Figure 7:
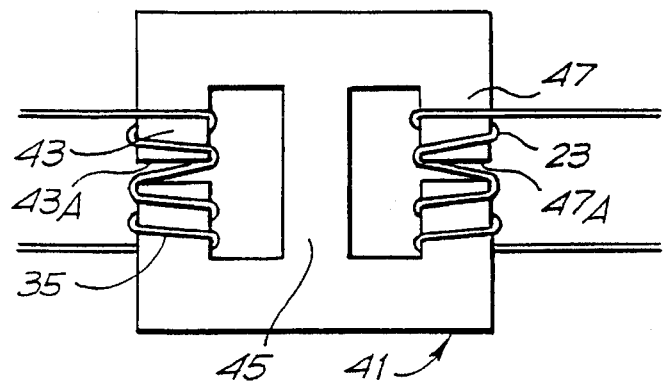
FIG. 7 shows schematically the disposition of the windings on a single ferromagnetic core.

To reduce the overall size of the circuit, the inductances 35 of the auxiliary resonant circuit and 23 of the load circuit may be wound on a single ferromagnetic core. This solution is shown schematically in FIG. 7, where the number 41 indicates a ferromagnetic core with three columns 43, 45 and 47. The columns 43 and 47 have corresponding air gaps 43A and 47A. The windings of inductances 35 and 23 respectively are wound on these columns.

It is to be understood that the drawing shows only an example provided solely as a practical demonstration of the invention, and that this invention may be varied in its forms and dispositions without departure from the scope of the guiding concept of the invention. The presence of any reference numbers in the enclosed claims has the purpose of facilitating the reading of the claims with reference to the description and to the drawing, and does not limit the scope of protection represented by the claims.

I claim:

1. Electronic reactor, or ballast, for a discharge lamp (L), comprising:

a bridge rectifier (5) connected to an alternating voltage source (3);

a half-bridge with two controlled switching means (11, 13) made alternately conducting to connect the said lamp (L) and the said bridge rectifier (5);

a resonant load circuit (17) connected to the said half-bridge (11, 13) and including the said lamp (L); and a smoothing capacitor (29) connected in parallel with the half-bridge (11, 13);

and wherein an auxiliary resonant circuit (33) is connected between the output (19) of the half-bridge (11,13) and the positive pole (5A) of the bridge rectifier (5).

2. Reactor according to claim 1, characterized in that the said auxiliary resonant circuit (33) is a series resonant circuit with a capacitive component (37) and a inductive component (35).

3. Reactor according to claim 1, characterized in that the load circuit (17) comprises one capacitor (21) in parallel with the said lamp (L) and one inductance (23) in series.

4. Reactor according to claim 3, characterized in that the winding of the inductance (22) of the load circuit (17) and the winding of the inductance (35) of the auxiliary resonant circuit (33) are wound on a common ferromagnetic core (41).

5. Reactor according to claim 4, characterized in that the said common ferromagnetic core (41) comprises three columns (43, 45, 47), two of which (43, 47) have corresponding air gaps (43A, 47A).

6. Reactor according to claim 1, characterized in that the load circuit (17) has two or more discharge lamps.

7. Reactor according to claim 2, characterized in that the load circuit (17) has two or more discharge lamps.

8. Reactor according to claim 3, characterized in that the load circuit (17) has two or more discharge lamps.

9. Reactor according to claim 4, characterized in that the load circuit (17) has two or more discharge lamps.

10. Reactor according to claim 5, characterized in that the load circuit (17) has two or more discharge lamps.

* * * * *